Patented Jan. 30, 1923.

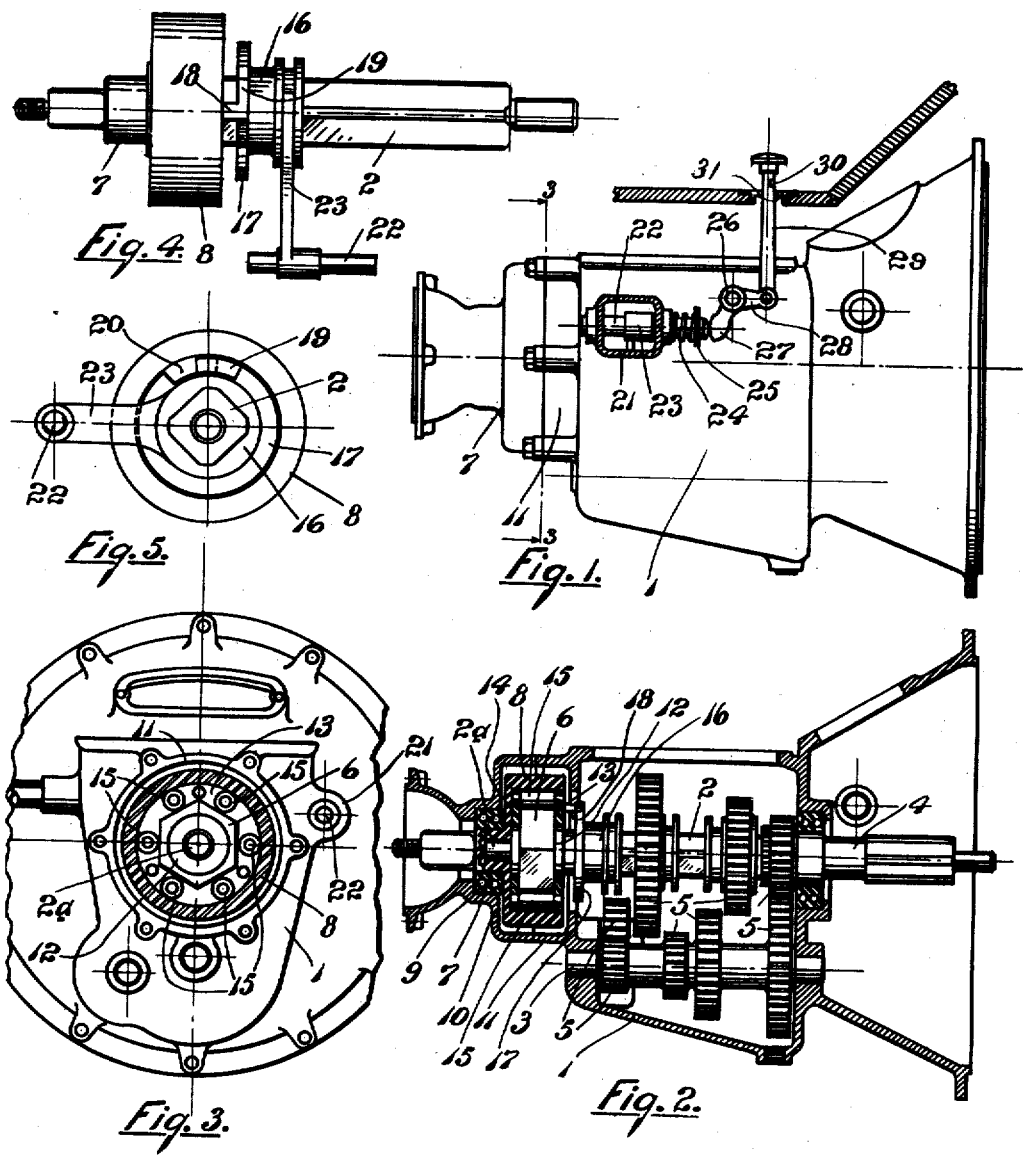

1,443,591

UNITED STATES PATENT OFFICE.

BAYARD E. RICHARDSON, OF GRAND RAPIDS, MICHIGAN, ASSIGNOR TO MECHANO GEAR SHIFT CO., OF GRAND RAPIDS, MICHIGAN, A CORPORATION OF MICHIGAN.

TRANSMISSION GEAR AND CLUTCH MECHANISM.

Application filed November 13, 1918, Serial No. 262,394. Renewed June 30, 1922. Serial No. 572,022.

*To all whom it may concern:*

Be it known that I, BAYARD E. RICHARDSON, a citizen of the United States of America, residing at Grand Rapids, in the county of Kent and State of Michigan, have invented certain new and useful Improvements in Transmission Gear and Clutch Mechanism; and I do hereby declare the following to be a full, clear, and exact description of the invention, such as will enable others skilled in the art to which it appertains to make and use the same.

This invention relates to a gear transmission combined with a cooperating clutch mechanism, particularly adapted for use with a motor vehicle sliding gear transmission and one in which the strain imparted to the gears during the operation of changing the same from the driving of the gears from the rear axle of the vehicle due to the momentum of the vehicle, is automatically eliminated by the action of the clutch. This is a primary object and purpose of the invention and the invention is concerned with a novel construction for accomplishing this result. A further object of the invention is to provide a clutch construction in combination with a sliding gear transmission which is of the over-running type so that the vehicle in which the transmission and clutch mechanism is installed, may run under its own momentum without affecting, in any way, the transmission gearing, thus permitting the vehicle to coast down inclines and allow the motor to run idle with a consequent saving of fuel. A still further object of the invention is to provide controlling means, readily operable by the driver of the vehicle, for rendering the over-running clutch inoperative, as is necessary when a reverse movement of the vehicle is to be had. Still further objects are to provide a novel and very simple construction of clutch mechanism readily adaptable to sliding gear transmissions for attainment of the above described advantages, yet capable of many other different applications, the clutch in no way being limited to the one use. All of these features of novelty and utility will fully appear as understanding of the invention is had from the following description taken in connection with the accompanying drawing, in which, Fig. 1 is a side elevation, parts being broken away and shown in section, of a transmission of a motor vehicle equipped with the invention.

Fig. 2 is a longitudinal vertical section through the transmission gearing and associated clutch mechanism.

Fig. 3 is a section substantially on the line 3—3, of Fig. 1.

Fig. 4 is a plan view of the clutch and associated control arm therefor, and

Fig. 5 is an end view thereof, from the right of Fig. 4.

Like reference characters refer to like parts in the different views of the drawings.

Within the transmission case 1 there are a main shaft 2, substantially square in cross section, and a counter shaft 3, the first of which shafts is in alinement with shaft 4 which is adapted to be driven from the engine of the motor vehicle with which the transmission is associated. A series of gears 5 are mounted on the shafts 2, 3 and 4 in the usual and well known manner to make a selective sliding gear transmission by means of which shaft 2 may be driven at different speeds with respect to shaft 4, in the present instance, three different speeds in a forward direction and one in a reverse direction.

Adjacent the rear end of the shaft 2 a short enlarged hexagonal extension is provided, being either formed integrally with shaft 2 or fixed thereon in any suitable manner. The rear end 2ª of shaft 2 has a bearing in a cylindrical rear extension 7 to a cup-like housing 8 which forms one member of the clutch and into which the hexagonal member 6 is inserted as shown. The extension or neck 7 in turn has rotative bearing in a suitable bearing 9 which is mounted in a casing or housing member 10 for the clutch, said member 10 together with an annular rearwardly extending rib or flange 11 cast integral with the transmission casing 1 forming a housing completely enclosing the clutch.

Shaft 2 at each side of the hexagonal enlargement 6 thereof is formed with somewhat enlarged short cylindrical collars 12 around which front and rear rings 13 and 14 are placed, having an outer diameter but slightly less than the inner diameter of the clutch member 8. A plurality of rollers 15 are disposed between the rings 13 and 14, one between each side of the hexagonal member 6 and the inner sides of the member 8. These rollers are freely rotatable between the rings 13 and 14 and of such size that the same are loose between the middle parts of the sides of the hexagon but cannot pass over the corners thereof.

A collar member 16 is slidably mounted on the squared portion of shaft 2 in front of the clutch and at its rear end has an enlarged annular flange 17. An arm 18 is fixed to the front ring 13 projecting a short distance in front thereof and then turning at right angles to make an arm 19 which, normally, is received in a notch 20 cut in flange 17. On the transmission case 1 a small housing 21 is cast in which a rod 22 is slidably mounted, an arm 23 having a yoke at its inner end to engage with the collar on member 16 being fixed on said rod 22 and extending through and into the transmission case to connect with the collar. The front portion of rod 22 passes a short distance through the housing 21 in front and a coiled spring 24 interposed between said housing and a collar 25 at the front end of the rod 22 has a normal tendency to bring it to front position whereby the flange 17 is in position such that its notch 20 receives the arm 19 as shown in Fig. 4. On a pin 26 fixed to and projecting from the transmission case 1 a bell-crank lever is pivotally mounted, a downwardly extending arm 27 thereof resting against the front end of the rod 22 and a forwardly extending arm 28 being pivotally connected to a vertical operating bar 29 which passes through the floor of the front compartment of the motor vehicle. This bar has a notch 30 in a side thereof which, in normal upper position of the bar comes above a plate 31 in the floor of the compartment, but which, on downward movement of the bar comes directly opposite the plate so as to receive it in the notch, whereby the bar may be held in lower position until released by drawing the same back at its upper end. The bar 29 may be readily depressed by the foot of the driver of the vehicle with a consequent compression of the spring 24 and movement of flange 17 back of the plane of the arm 19.

When the shaft 2 is driven by the shaft 4 in the same direction with any one of the three forward speeds, it is apparent that there is a tendency for the collar member 16 to rotate away from the arm 19 with movement of the flange 17 away from the end of the arm. This causes the sides of the member 6 to come against the adjacent rollers 15 which becoming wedged between said sides of the member 6 and the inner sides of the member 8 causes a connection between the two members 6 and 8 whereby said member 8 is driven. The extension to the member 8 at the rear is adapted to connect in the usual manner with the drive shaft of a motor vehicle it in turn driving the rear axle. At the time of shifting gears, the driving clutch between the engine and transmission is thrown out and the transmission is driven, if at all, by the rear axle due to the momentum of the vehicle. With my invention, however, any driving movement from the momentum of the car given to the outer clutch member 8 is not transmitted to the shaft 2 due to the fact that the first effect of such driving movement is to release the rollers from their wedged position between the members 6 and 8 with a movement tending to wedge the rollers again between said members but at the opposite sides of the mid points of the faces of the hexagonal member, which movement is checked as soon as the clutch members 6 and 8 are free of each other by engagement of the end of the arm 19 against the flange 17 at the end of the elongated slot 20 therein. The rollers 15 are thereby held substantially at the middles of the faces of the hexagonal member 6 and the outer clutch member 8 rolls freely thereon. This feature of operation is also of great value in that the transmission gearing is left entirely free from any driving force when the gears are changed, eliminating entirely any destructive force when the gears are brought together or any other undesirable stresses or strains in the gearing when the change of gears takes place. And it is particularly valuable in certain types of gear shift mechanisms where the force of the driving clutch spring is made use of to cause the shift of gears after an earlier selection of the gears to be shifted.

When the collar member 16 is moved to the rear, freeing flange 17 from the arm 19, the clutch members 6 and 8 lock together irrespective of which way the shaft 2 is rotating, this following from the removal of the stop which otherwise would hold the rollers 15 at the middle of the faces of the member 6. With the construction as shown and described, this movement of the collar member 16 occurs automatically with the shifting of the rear sliding gear of the transmission on shaft 2 to its connection with the reverse pinion, said gear engaging against member 16 and moving it far enough to the rear to disassociate arm 19 from the flange 17. This is an important feature of the invention, as the connection of the transmission shaft 2 and the drive shaft of the vehicle must take place before the driving clutch is let in to connect the transmission shaft with the engine, and this automatic action following from the movement of a gear of the transmission to reverse drive position, insures against any abrupt connection of the driving power of the engine with the drive shaft of the vehicle. The construction described whereby the members of the clutch may be connected at the will of the driver of the vehicle irrespective of the direction of turning movement of the transmission shaft or drive shaft of the vehicle, is of value, for instance, when the vehicle is going down a steep grade and it is desired to use the engine as a brake or check against too rapid movement of the vehicle, as well understood by all drivers of motor vehicles. With a clutch of the construction described, the means for permitting the locking together of the clutch members, irrespective of their rotative movement is a necessary addition in motor vehicle construction, as otherwise the inner clutch member and rollers at its faces would merely turn within the outer clutch member when attempted reverse movement of the vehicle took place.

The construction is very simple and practical. It has been used in actual practice and has proven of great value and practically serviceable in all respects. There are, doubtless, other relations in which the clutch may be used, and I, accordingly, do not wish the invention to be limited to the specific disclosure made but consider myself entitled to all modifications in construction coming within the scope of the appended claims defining the invention.

I claim:

1. In combination, a shaft, an inner clutch member thereon comprising a member having a plurality of faces located at an angle to each other, said clutch member having a short collar at each side thereof slightly larger in diameter than the diameter of the shaft, a ring loosely mounted on each collar, a plurality of rollers rotatably mounted on and between the rings, one of said rollers being located at each side of the said clutch member, an outer clutch member having a cylindrical inner surface, into which outer clutch member the inner member, rings and rollers are inserted with the corners of the inner member spaced from the inner surface of the outer member a distance less than the diameters of the rollers, and means for turning the rings and connected rollers with the shaft in one direction of its turning movement but not in the other whereby the clutch members are free to move with respect to each other when the shaft is turned in one direction and the outer clutch member in the opposite direction, but locked together when the turning movements are in the reverse directions, substantially as described.

2. A construction containing the elements in combination claimed in claim 1, combined with means for rendering the ring turning means inoperative whereby the clutch members are locked together irrespective of the direction of turning movements thereof.

3. In combination, a shaft, an inner clutch member thereon, an outer clutch member located outside of the inner member, said inner member having a plurality of faces disposed at an angle to each other, a ring at each end of the inner member, rollers rotatably mounted on and between the rings, a roller being positioned at each face of the inner clutch member and of a diameter prohibiting the passage of the roller past the adjacent corners of said member, a collar slidably mounted on the shaft and provided with a flange with a notch therein adjacent one of said rings, and a member attached to said ring and extending into said notch at one end thereof, substantially as and for the purposes described.

4. In combination, a shaft, an inner clutch member having a plurality of faces positioned at an angle to each other, an outer clutch member within which the inner member is located, said outer member having a cylindrical inner surface, a ring at each end of the inner member, a plurality of rollers rotatably mounted on and between the rings, one adjacent each face of the inner member and of a size prohibiting the passage thereof between the corners of said inner member and the outer member, a collar splined on the shaft and provided with a flange having an elongated notch therein, a member projecting from the ring adjacent said collar and flange and adapted to enter the notch in the flange so as to strike against the flange when the shaft is rotated in one direction and hold the rollers at substantially mid position with respect to the faces of the inner member, and means to move said collar to render said engagement of said member on the ring with the flange ineffective, substantially as described.

5. In combination, a sliding gear transmission including a shaft and gearing whereby the shaft may be driven in a forward direction at different speeds and also in a reverse direction, said shaft being adapted to drive the driving shaft of a motor vehicle, a clutch disposed at the rear end of the shaft and between it and the driving shaft of the vehicle and including means for normally connecting the shafts together, and means mounted movably on said transmission shaft and adapted to be operatively associated with the clutch to disconnect driving relation between the transmission and drive shafts when the transmission shaft is turned in a reverse direction, or the driving shaft in a forward direction, said means on the transmission shaft being movable to an inoperative position whereby the shafts are connected together irrespective of their directions of turning movement.

6. In combination, a sliding gear transmission including a shaft and gearing whereby the shaft may be driven in a forward direction at different speeds and also in a reverse direction, a casing housing the same, a clutch disposed at the rear end of the transmission shaft and operative to connect the transmission shaft with the driving shaft of a motor vehicle, means on the shaft associated with the clutch for normally disconnecting the transmission and drive shafts when the transmission shaft is driven in a reverse direction or the drive shaft in the opposite direction, and means mounted on the transmission case and connected to said means on the shaft to move the same into inoperative position whereby the transmission and drive shafts are connected together irrespective of the directions of their turning movements.

7. In combination, a sliding gear transmission including a shaft and gearing whereby the shaft may be driven in a forward direction at different speeds and also in a reverse direction, a clutch member at the rear end of the transmission shaft, a second clutch member rotatably mounted at the rear of the transmission gearing and receiving the first clutch member, a casing enclosing the transmission gearing and shaft and said clutch members, means disposed between the clutch members for locking them together, a member splined on the transmission shaft adjacent the clutch, means interposed between said member and the clutch member locking means for rendering the locking of the clutch members inoperative when the shaft is turned in a reverse direction or the rear clutch member in a forward direction, a rod slidably mounted at one side of the transmission casing, an arm thereon connected with the member splined on the transmission shaft, spring means normally holding the member on the shaft and said interposed means between it and the clutch in engagement, and means for moving the rod and attached member to an inoperative position whereby the clutch members are locked together on reverse movement of the transmission shaft, substantially as described.

8. A construction containing the elements in combination claimed in claim 7, in which said last mentioned means for moving the rod comprises a bell-crank lever pivotally mounted at one side of the transmission casing, one arm thereof engaging against the rod, and an operating rod pivotally connected to the other arm of the lever in position to be engaged by the foot of the driver of the vehicle, substantially as described.

9. In combination, a sliding gear transmission including a shaft and gearing whereby the shaft may be driven in a forward direction at different speeds and also in a reverse direction, a clutch disposed between said shaft and the driving shaft of a motor vehicle, said clutch including means for normally connecting the shafts together, and means movably mounted on the transmission shaft and operatively associated with the clutch to disconnect driving relation between the transmission shaft and drive shaft when the transmission shaft is turned in a reverse direction or the driving shaft in the opposite direction, said means on the transmission shaft being automatically engaged by a sliding gear of the transmission when it is moved to reverse drive position whereby said clutch disconnecting means is moved to inoperative position with respect to the clutch, and the shafts are connected together irrespective of their directions of rotative movement.

10. In combination with a transmission gearing including sliding gears whereby a plurality of forward speeds and a reverse speed may be had, of a clutch driven by the transmission, said clutch including two members and a means disposed between them normally acting to lock the members together, and means associated with the clutch acting normally to prevent connection of the clutch members when the transmission is operating at reverse speed, said last mentioned means being automatically moved to inoperative position with the movement of the sliding gear of the transmission gearing to position to effect reverse speed, substantially as described.

In testimony whereof I affix my signature.

BAYARD E. RICHARDSON.